Figures 1, 2:
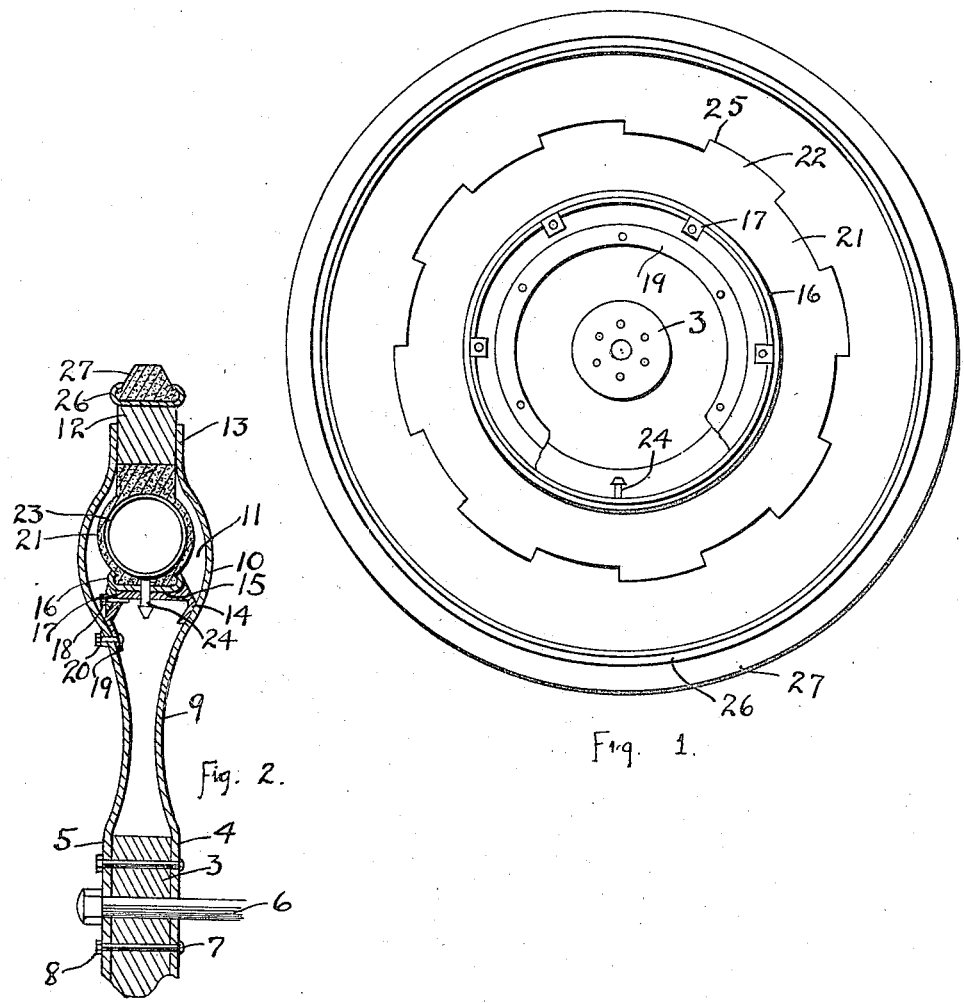

Aug. 21, 1923.　　　　　　　　　　　　　　　1,465,476

F. C. LANE

RESILIENT VEHICLE WHEEL

Filed March 26, 1923

F. C. Lane  Inventor

By Jesse R. Stone

Attorney

Patented Aug. 21, 1923.

1,465,476

UNITED STATES PATENT OFFICE.

FLOYD C. LANE, OF HOUSTON, TEXAS.

RESILIENT VEHICLE WHEEL.

Application filed March 26, 1923. Serial No. 627,772.

*To all whom it may concern:*

Be it known that I, FLOYD C. LANE, a citizen of the United States, residing at Houston, Harris County, Texas, have invented a certain new and useful Improvement in Resilient Vehicle Wheels, of which the following is a full, clear, and exact description, such as will enable others skilled in the art to which it appertains to make and use the same.

My invention relates to tires for motor vehicles.

It is the object of my invention to provide a resilient wheel for use on vehicles having thereon a pneumatic shock-absorbing means, said means being out of contact with the roadway.

Another object is to provide a wheel where the pneumatic tire is placed between the hub of the wheel and the tread portion of the same, but in which the usual advantages of the pneumatic tire may be obtained, and the danger of puncture or accident to the tire largely avoided. In the use of a wheel of this type, few accidents to the wheel will occur, and the tires will last for long periods of time.

Other objects and advantages of my invention will be set forth with greater clearness in the specification which follows:

Referring to the drawing herewith, wherein like numerals of reference are applied to like parts in both the views, Fig. 1 is a side elevation of my improved tire with one of the side plates removed and with some of the parts broken away for greater clearness; Fig. 2 is a central vertical section through one half of the wheel showing the construction of my invention.

In forming my wheel, I desire to have a tread portion in contact with the ground, which will be noiseless and will have the usual traction effect, but to space away from this tread portion a pneumatic tire which will serve to take up the shocks due to contact with the roadway and yet will not be liable to wear or to puncture due to the contact with the road.

In forming my wheel, I provide a central hub or spacing member 3, which is formed of wood or any similar light material, this hub acting to space the two side plates 4 and 5 apart. The said plates and the hub 3 are provided with an opening therethrough to receive the axle 6, which may be of any preferred construction, the axle in the drawing being more or less diagrammatic. The two plates are secured detachably to the hub by means of transverse bolts 7 secured in position by nuts 8 thereon.

The inner plate 4 in my wheel is flattened adjacent the hub and is then curved inwardly at 9, and then recurved outwardly at 10 to provide a chamber 11 to house the pneumatic tire. The plate is then again curved inwardly and outwardly to bear against the rim 12 along the margin 13 of the said plate. At the inner side of the plate 4 on the curved portion 10 within the chamber 11 I secure, by welding, or other means, a permanent rim 14. This rim has a seat formed in the outer periphery thereof at 15, to receive the ordinary detachable rim 16 thereon. The rim 16 will be secured in place upon the permanent rim by means of lugs 17 secured in position by means of bolts 18. The outer side of the permanent rim 14 is inclined outwardly to form a seat for the lugs 17, which secure the rim in position, and is then curved inwardly at 19 and attached to the outer plate 5 by means of transverse bolts 20.

The detachable rim 16 is adapted to form a seat for a pneumatic tire 21, which is similar to the ordinary tire casing in all respects except that the outer tread portion is provided with spaced radial lugs 22 thereon, as shown particularly in Fig. 1. Within the casing 21 is an ordinary pneumatic tube 23 which serves to inflate the casing and has a valve stem 24 thereon, of the usual construction.

Outside the casing 21 is a wooden rim or felly 12 which fits closely against the said casing, and has radial recesses 25 therein adapted to receive the lugs 22 upon the tire. The felly may be made of wood, or any light material and is of the same width as is the outer portion of the tire casing. The outer edges of the two plates 4 and 5 bear slidably against the felly and serve to limit the lateral movement of the felly upon the tire. The outer tread portion of the felly is provided with a metal rim 26 which has thereon a solid tire 27 of rubber or other similar composition, to form a noiseless cushion for the wheel.

In the use of my wheel, the outer plate 5 may be easily removed by detaching the nuts 8 which secure it to the hub and also detaching the nuts 20 upon the bolts which secure the plate to the rim. The tire upon the detachable rim 16 may be then placed upon the permanent rim and the felly with the rubber tread thereon may be fitted over the casing. The tire may then be properly inflated in the usual manner by means of the valve 24, and the plate 5 may be again secured in position. When the device is in use upon a vehicle the shocks due to travel upon the roadway will be received by the outer tire and felly 12, and transmitted to the pneumatic cushion formed by the tire 21. This cushion will act as does the ordinary pneumatic tire to absorb the shock. The felly 12 being of rigid material will be driven inwardly between the two side plates at the bottom of the wheel, which is then in contact with the roadway, and the upper portion of the felly will be moved upwardly in an obvious manner. The shock will thus be absorbed in the same manner as is done by the ordinary pneumatic tire, but there will be no contact on the pneumatic tire with the ground, and, hence, no danger of puncture from nails, glass or other sharp objects. There will be, therefore, little danger of deflating the tire, and it will last for long periods of time. If, however, the tire becomes deflated, due to defective valve or a leak in the inner tube, it may be detached and mended in the same way as is the ordinary tire, and with little difficulty. A wheel thus constructed will be attractive in appearance, being not much different from the ordinary steel disk wheel, and will have the advantage of being practically puncture proof, and the tires thereon will last for much longer periods than will the ordinary tire.

Having thus described my invention, what I claim as new and desire to protect by Letters Patent, is:

1. In a vehicle wheel the combination of a hub, two spaced plates secured thereto, a permanent rim formed on one of said plates spaced inwardly from their outer edges, a detachable rim on said permanent rim, a pneumatic tire thereon, a solid felly outside said tire and secured non-rotatably thereon, said plates forming a housing for said tire and adapted to fit slidably against said felly.

2. In a vehicle wheel the combination of a hub, two spaced circular plates secured thereto, a permanent tire rim formed on the inner of said plates on a line spaced inwardly from the outer edge thereof, a detachable rim on said permanent rim, a pneumatic tire on said detachable rim, a felly of light material fitting non-rotatably on said tire, and a rubber tread on said felly.

3. In a vehicle wheel, a hub, two spaced circular plates secured thereto, a tire rim projecting laterally from one of said plates, a demountable rim thereon, a tire and casing on said demountable rim, and a felly outside said casing movable radially between said plates.

4. In a vehicle wheel, a hub, spaced circular plates thereon, a rim formed on one of said plates, a pneumatic tire and casing on said rim, spaced lugs on the outer periphery only of said casing, a felly outside said casing having spaced recesses to receive said lugs, and means on said plates to retain said felly on said casing.

In testimony whereof, I hereunto affix my signature this 22nd day of March, A. D. 1923.

FLOYD C. LANE.